United States Patent [19]

Gural

[11] Patent Number: 4,748,507
[45] Date of Patent: May 31, 1988

[54] SOLID STATE IMAGING DEVICE HAVING MEANS TO SHIFT THE IMAGE BETWEEN SCANS AND ASSOCIATED CIRCUITRY TO IMPROVE THE SCANNED IMAGE

[76] Inventor: Kenneth Gural, 7207 Dartmouth Ave., College Park, Md. 20740

[21] Appl. No.: 920,186

[22] Filed: Oct. 17, 1986

[51] Int. Cl.$^4$ .............................................. H04N 3/14
[52] U.S. Cl. ........................... 358/213.28; 358/213.17
[58] Field of Search ...................... 358/213.13, 213.17, 358/213.26, 213.28, 163

[56] References Cited

U.S. PATENT DOCUMENTS

| | | | |
|---|---|---|---|
| 2,026,376 | 12/1935 | Colgate | 83/24 |
| 4,167,754 | 9/1979 | Nagumo et al. | 358/167 |
| 4,288,817 | 9/1981 | Igel | 358/163 |
| 4,383,170 | 5/1983 | Takagi et al. | 250/216 |
| 4,481,539 | 11/1984 | Meise et al. | 358/213.17 |
| 4,488,178 | 12/1984 | Koslov et al. | 358/163 |
| 4,535,363 | 8/1985 | Harada et al. | 358/213 |
| 4,541,016 | 9/1985 | Ochi et al. | 358/228 |
| 4,543,601 | 1/1985 | Harada et al. | 358/213 |
| 4,567,524 | 1/1986 | Levine | 358/213 |
| 4,581,649 | 4/1986 | Morokawa | 358/212 |
| 4,595,954 | 6/1986 | Endo et al. | 358/213 |
| 4,633,317 | 12/1986 | Uwira et al. | 358/213.28 |

FOREIGN PATENT DOCUMENTS 53-101939  12/1978  Japan ............................ 358/213.28

Primary Examiner—Jin F. Ng
Assistant Examiner—Stephen Brinich

[57] ABSTRACT

In a conventional imaging system wherein there exists a tendency for portions of the system elements to be defective, the image is shifted relative to the image sensing elements prior to scanning the elements so that the defective portions of the system will be associated with different portions of the image during at least two scans. Correction circuitry provides an image signal which is compensated for the defective portions and for the shifted image.

24 Claims, 9 Drawing Sheets

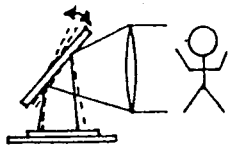 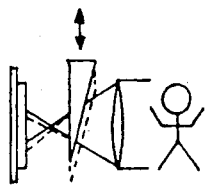 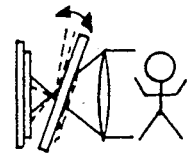
Fig. 3a     Fig. 3b     Fig. 3c
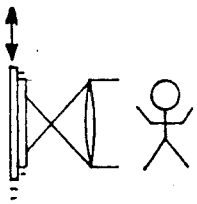 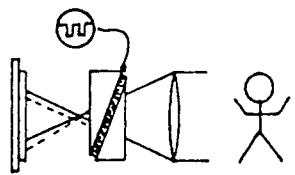
Fig. 3d     Fig. 3e
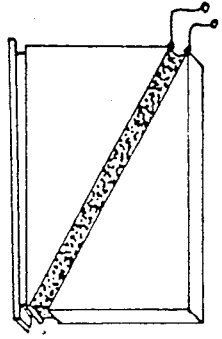 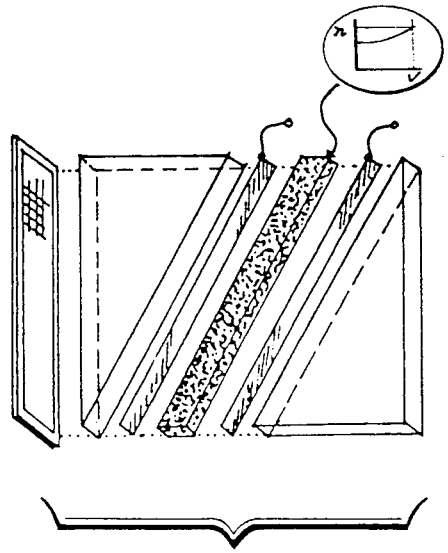
Fig. 4a     Fig. 4b

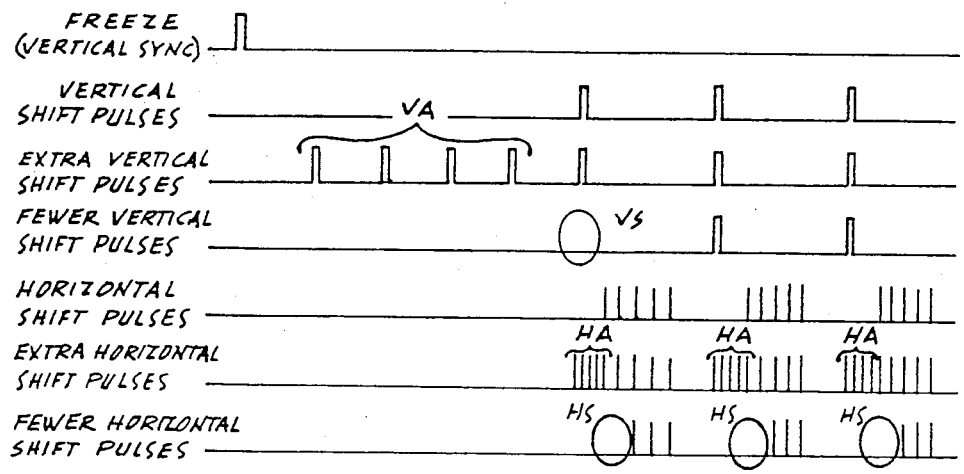
Fig. 5a
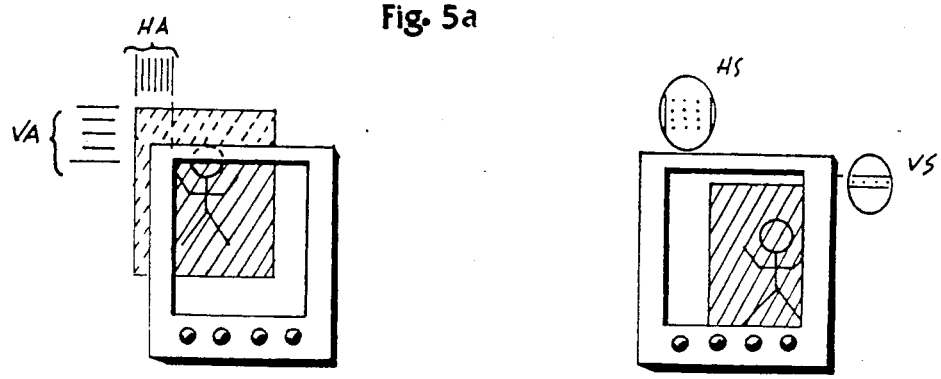
Fig. 5bFig. 5c

SOLID STATE IMAGING DEVICE HAVING MEANS TO SHIFT THE IMAGE BETWEEN SCANS AND ASSOCIATED CIRCUITRY TO IMPROVE THE SCANNED IMAGE

BACKGROUND OF THE INVENTION

Solid state imaging devices contain an array of many thousands of individual imaging elements along with means for sampling the imaging elements in succession to produce a raster scan. Whether the imaging elements are sensitive to optical, infra-red, ultra-violet, X-ray, gamma-ray or other electromagnetic energies, or to sonic or charged particle energies, a common problem in the fabrication of these imaging devices is due to microscopic defects that cause a small percentage of the imaging elements or the scanning circuitry to be defective. Thus, an array comprising many thousands of elements must be discarded because of the defects in only a few of the elements. At the present time, as many as 95% of the complete imaging devices produced must be discarded as partially defective.

Several methods have been employed in the past to try to allow the use of partially defective imaging devices. One method, taught for example by F. Nagumo et al in U.S. Pat. No. 4,167,754, provides a memory for storing the addresses of imaging defects, and means to substitute some combination of neighboring image values for the defective points. Such methods can provide only an approximation to the missing image point.

Another method makes use of a beam splitter to split the incident energy into two beams incident upon two partially defective imaging devices. As taught, for example in U.S. Pat. No. 4,488,178 to J. Koslov et al for the optical case, such a method can be effective in reducing the imaging defects if the two imaging devices contain non-coincident defects. One major problem with such methods concerns registration of the two devices. Another problem is that two imaging devices must be employed for each imaging system, thereby restricting this method of increasing the yield of imaging devices to at most 50%.

In a third method, more akin to the present invention, a dither motion is provided in the image relative to the imaging device. As disclosed in a recent U.S. Pat. No. 4,581,649 to S. Morokawa by vibrating the sensor or the image at a single frequency or a combination of pseudo-random frequencies, and taking samples of the image points at different phases in the motion of the image, a series of values from different imaging elements can be obtained for the same image point. These values are compared to produce (by majority decision, e.g.) a best value for the image point.

Although the patent to Morokawa discloses a first step in the productive utilization of the concept of the shifting the image across the imaging device for the purpose of providing the redundancy necessary for reducing the effect of imaging defects, many problems still exist in the system presented by Morokawa.

Most importantly, because the scans A, B, C, and D occur after periods of motion of the imager or image (represented e.g. by the time between successive sampling clock pulses CLA and CLB of FIG. 6B), the resultant image signal will be an average over the motion during that time. In other words, the resultant signal will be blurred. It should be noted that with current technology and at standard scan rates, the image sensors require a substantial portion of the time between each sampling in order to obtain a sufficient number of optical photons (or X-rays, phonons, etc.) to produce a viable signal. If the displacement of the image relative to the imager is as large as shown in FIG. 1 during that time, the blurring will be across a large portion of the image. Moreover, because the separate scans are taken at different phases of the motion of the imager, the blurring will be in different directions. As shown in FIG. 6B, blurring will be in one direction for scans B and C, and the opposite direction for scans D and A. Thus, the majority logic or other combination means for determining the correct image data will be frustrated, since the signals B, C and A, D will be substantially different.

Other prior art considered to be relevant to the present invention are the following U.S. patents:
U.S. Pat. No. 4,595,954 Y. Endo et al, 358/213
U.S. Pat. No. 4,567,524 P. Levine, 358/213
U.S. Pat. No. 4,543,601 N. Harada et al, 358/213
U.S. Pat. No. 4,541,016 S. Ochi et al, 358/213
U.S. Pat. No. 4,535,363 N. Harada et al, 358/213
U.S. Pat. No. 4,383,170 N. Takagi et al, 250/216
U.S. Pat. No. 4,288,817 A. Igel, 358/163
U.S. Pat. No. 2,026,376 S. Colgate The patents to Endo and Harada are of interest in that they disclose imaging systems in which the motion of the image relative to the imaging elements follows a trajectory of sudden motion and a subsequent long stationary phase. In addition, these patents further disclose shutter means for blocking the image from reaching the imaging elements during the period of motion. However, these patents are concerned only with increasing the resolution of a perfectly functional imaging device rather than the use of a device having defective portions. In addition, no means for compensating for the shift in location of the image relative to the imaging elements is disclosed.

OBJECTS OF THE INVENTION

Therefore, an object of the present invention is to provide a method and system whereby defective portions of the imaging means are associated with different portions of the image during all scans.

Another object of the invention is to provide an improved imaging method which allows the use of a partially defective imaging device wherein blurring of the image caused by shifting the image relative to the imaging elements is not a problem.

Another object of the invention is to provide an imaging system allowing the use of a very large array of imaging elements yet only a small additional array of storage elements for providing complete compensation for defective portions of the imaging means.

Another object of the invention is to provide a simplified means for shifting the image relative to the imaging device for optical imaging systems, having increased reliability through the use of solid state components.

Another object of the invention is to provide an improved imaging system having means to compensate for distortions in the image caused by the shifting of the image relative to the imaging device.

SUMMARY OF THE INVENTION

The present invention provides an improvement for a conventional imaging system whereby defective portions of the imaging system may be associated with different portions of the image during successive scans, thereby reducing the effect of any defective portion of the system on the resultant image signal. The improvement entails shifting the image relative to the image sensing elements between scans of the elements and electronically compensating for the shift in the relative location of the image and image sensors. Since the shifting of the relative location occurs essentially prior to a new exposure of the imaging means, the image is substantially stationary relative to the imaging means during the exposure, and thus blurring of the image is minimal. Additional means may be employed to further reduce the blurring, such as a shutter to pass the image only during the stationary period, or means to clear the integrated charges from the imaging means after the shifting of the image to further improve the quality of the image. A small additional memory may provide further compensation for defective portions of the system by holding values during one scan to replace defective values during a second scan corresponding to a new relative location of the sensing elements and the image.

In the preferred embodiment of the invention incorporating optical imaging means, the means for shifting the image relative to the imaging elements comprises a refractive assembly wherein the index of refraction varies with an applied voltage. The assembly is permanently affixed to the surface of the solid-state imaging chip. This electronically responsive arrangement eliminates bulk motion of the imaging means or optical assembly.

The foregoing describes a preferred form of the invention. The scope of the invention, however, is pointed out with particularlity in the appended claims. The above and further objects and advantages of this invention may be better understood by referring to the following description taken in conjunction with the accompanying drawings.

BRIEF DESCRIPTION OF THE DRAWINGS

FIGS. 3a through 3e depict various means that may be employed with the present invention for providing relative movement between the image and the image sensing elements.

FIG. 4a shows an electro-optic assembly for shifting the image that is used in a preferred embodiment of the invention.

FIG. 4b shows an exploded view of the assembly of FIG. 4a.

FIG. 5a shows various timing patterns that may be used in the invention to compensate for the shifting of the image relative to the image sensors.

FIGS. 5b and 5c show the effects of some of the compensation timing patterns of FIG. 5a on a standard display scene.

FIG. 6 shows a prior art circuit for producing some of the timing patterns in FIG. 5a.

FIG. 11b shows a cross-sectional diagram of the cell depicted in FIG. 11a.

DETAILED DESCRIPTION OF THE INVENTION

Figure 1:
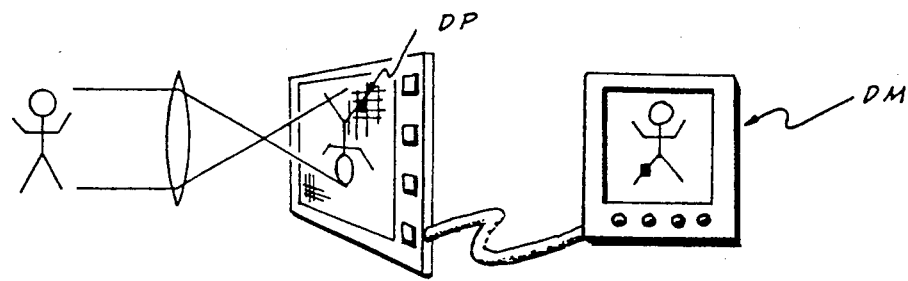
FIG. 1 shows a conventional imaging system and display means wherein the imaging system has a defective element.

FIG. 1 shows a conventional solid state imaging device having a defective pixel DP which is engaged in imaging an object S. The defective pixel causes a permanent spot to appear on the display means DM.

Figure 2:
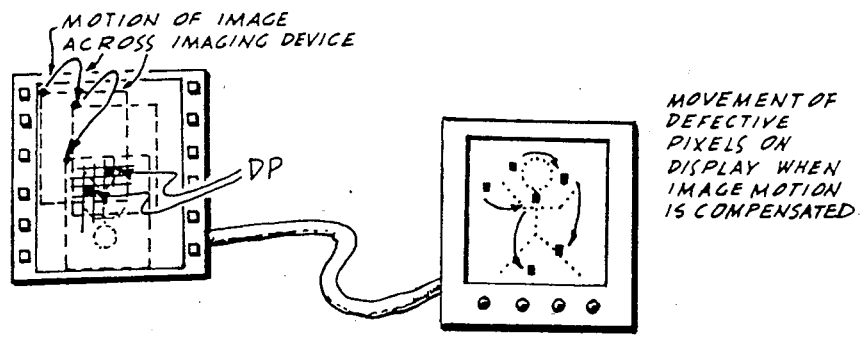
FIG. 2 shows one embodiment of the invention in which an imaging device with two defective pixels may be displayed with an improved image.

FIG. 2 shows a conventional solid state imaging device having two defective pixels (DP), and used in a system having means to shift the image relative to the imaging device as in the present invention. Without further processing of the image, the image would appear to move on the display while the defective spots would remain stationary on the display as in FIG. 1. However, this invention provides additional electronic means to compensate for the physical relative motion of the image and sensing elements, to be described below, so that the image appears stationary on the display even though the image is moving relative to the imaging means. As a result, the location of the two defective pixels will appear to move across the display and the effect of the defective pixels will be reduced through the integrating action of the human eye, much as an old and soiled motion picture will appear to have better image quality while viewing a succession of frames with random locations of scratches and marks than while viewing a single frame.

Several means may be employed within the scope of the present invention for shifting the image relative to the imaging means, as shown in FIGS. 3a-3e. In FIG. 3a, a mirror is vibrated about a pivot to cause an optical image to shift. In FIGS. 3b and 3c, a refractive element is vibrated in such a manner as to cause the image to shift. In FIG. 3d, the image is stationary, but the imaging means is vibrated. In all of these means presented so far, in order to produce a standard television scanning signal, a heavy object must receive a sudden motion during a period of time corresponding to a fraction of the vertical blanking interval (approx. 1 msec). Such a required motion, although within the realm of present technology, presents additional difficulties such as increased fatigue of the elements and the introduction of buzzing sounds.

Therefore, in the preferred embodiment of the present invention, as shown in FIG. 3e, an electro-optic means is employed for shifting the image. One such electro-optic means comprises two wedge-shaped transparent substrates between which are sandwiched transparent conductors and a thin, transparent layer whose index of refraction varies with an applied voltage, as shown in FIG. 4. Since the refractive layer is oriented at an angle to the optic axis, the image will shift depending upon the applied voltage. In a preferred embodiment of the invention, the electro-optic assembly is affixed directly to the integrated circuit comprising the image sensing elements and timing and scanning circuitry to provide a single improved imaging unit. Two electro-optic assemblies with shifting directions oriented in orthogonal directions may be concatenated collinearly with the integrated circuit in order to provide means for generating image shifts selectively in the horizontal and vertical directions. Electro-optic means such as these present increased reliability, durability, and silence to the electro-mechanical methods of FIGS. 3a–3d.

The present invention is designed as an improvement especially for those types of imaging devices that comprise an array of sensing elements and storage elements in order to provide a sudden "freeze frame" capture of the image. In such devices, the image signal is created through a cycle wherein the first step consists of exposing the sensing elements to the image for a period of time roughly equal to the time it takes to produce an entire raster scan. Then during a second step, the signals in all of the image sensors are rapidly transferred to the storage elements. This second step of "freezing" the image data in memory is carried out during a small fraction of the raster scan time. Finally, during a third step of the cycle (which usually occurs simultaneously with the exposure step of a new cycle), the image signal residing in the storage elements is steadily transferred element by element to the output port, thereby creating the raster scan signal.

Imaging devices exhibiting this three-step imaging cycle include each of the following devices, to be described in detail later: (a) freeze frame CCD devices, (b) transfer CCD devices, (c) matrix devices having at least two storage elements in each cell. By contrast, devices which would not work effectively in the present invention without further structure are devices that individually gate the sensing elements directly to the output port without an intervening storage element; e.g. conventional X-Y matrix devices without the additional storage element in each cell, and CID (charge injection) devices.

The freeze frame CCD imaging device comprises an array of interleaved sensing elements and storage elements, wherein each sensing element is located next to its corresponding storage element, separated only by a gate or a transfer channel. Upon receiving the 'freeze' signal, whatever image charges remain in the sensing elements are transferred en mass to the corresponding storage elements. Thereupon, the entire array of stored charges in the storage elements is transferred en mass by CCD means, moving a distance of one pixel at a time, to an output CCD horizontal line buffer, from whence a single line is rapidly shifted to the output port. While the letter en mass transfer of charges is taking place in the storage elements, the sensing elements are integrating charges for the next frame.

The transfer CCD imaging device comprises an array of sensing elements and a distinct but proximate array of storage elements. To store the signals of the sensing elements, the signals present in the combined arrays of sensing and storage elements are transferred en mass by CCD means until the signals of the sensing elements reside entirely in the storage elements. Thereupon, only the storage array is involved in further CCD transfers, still en mass but a distance of a line at a time. The transfer dumps the contents of the storage array into a CCD line buffer, then at the pixel rate to the output port.

Thus, the transfer of the charges from the sensing elements to the storage elements takes place during a short time, only a fraction of the time it takes to transfer the charges from the storage elements to the output port. During the latter time, the sensing elements are integrating the charges for the next frame.

An exemplary conventional matrix imaging device comprises an array of cells, each cell having at least a sensing element and a gating element and which is connected to one of a plurality of horizontal word lines and one of a plurality of vertical bit lines. An addressing signal on one of the word lines will activate the gates of all cells connected to that word line, to allow the charges of the sensing elements to be placed on their corresponding bit lines. The charges travel on the bit lines to a horizontal shift register, from whence they are shifted at the pixel rate to the output port. This type of imaging device is not suitable for the present invention without further structure, because the entire frame is not saved during a short time, but only a line at a time is saved.

One way to allow the matrix imaging device to be used in the present invention is to include an additional storage element and gating element in each cell, and an additional signal conductor connected in parallel to every cell. The additional gates are activated simultaneously by a signal on the additional conductor to cause the charges on each sensing element to be dumped to its corresponding additional storage element, where the charges remain until sensed by the conventional circuitry. A typical cell may be seen in FIG. 10.

For each of the imaging devices described above, suitable means may be provided to allow the device to be used in the present invention. In the simplest embodiment of the invention, it is necessary only to provide a voltage to the image shifting means to shift the image relative to the image sensors by an amount that is constant during the exposure period of the sensors (but varies from one scan to another), and a corresponding signal to the electronic scanning circuitry to provide the proper electronic compensation for the physical shift in the image. For the case of both types of CCD imaging devices, the electronic compensation may be provided simply by adding or subtracting shift cycles during the time that the charges are being shifted in the storage array. For example, in the case of the freeze frame CCD device, a few extra shift cycles performed just after the freeze signal but prior to the conventional shifting means for reading out the charges (cycles VA in FIG. 5a) will cause the signal to appear vertically higher on the display means, as shown in FIG. 5b. Similarly, a few extra shift cycles of the line output buffer before each line output shift period (cycles HA) will cause the signal to appear shifted to the left on the display means. If either of these extra shifting cycles, or some combination of them, is the correct amount to compensate for an apparent downward or rightward movement of the image relative to the sensing elements, then the image on the display will appear stationary, and only the defective pixels will appear to move on the display from one frame to the next, as shown in FIG. 2.

In a similar manner, shifting cycles may be subtracted from the vertical shifting period or from the horizontal shifting period if it is desired to cause a compensation in the location of the image in the other direction, as shown by the cycles VS and HS in FIG. 5a, and the display of FIG. 5c.

These words discussing the electronic compensation means for the freeze frame CCD imaging device also hold true for the transfer CCD device, inasmuch as shifting cycles added to or subtracted from the vertical shifting period, or added to or subtracted from the horizontal shifting period will result in the same relocation of the image on the display means. In the case of the transfer CCD device, however, the adjustment in number of vertical shifting cycles may be carried out either during the transfer period, when the charges are being transferred from the sensing elements to the storage elements, or during the scanning period when the charges are systematically transferred to the output port.

For the case of the matrix type of imaging device, the electronic compensation is provided by changing the pattern in which the word lines and the bit lines are addressed. For example, if a shift register is employed to provide the addressing of the word lines, then a few extra shift pulses at the beginning of the vertical scan period will cause a vertical displacement in the displayed image. Alternatively, if a counting register plus line decoder provides the means for selecting the word line, then a few additional clock pulses applied to the counting register will accomplish the vertical displacement. The same considerations apply to the horizontal addressing means, with respect to the shifting of one horizontal line to the output port.

Thus, for each of the types of imaging device considered above, the necessary electronic compensation for the physical shift of the image relative to the image sensors may be accomplished merely by adding or subtracting pulses from the already existent scanning circuitry. Methods for accomplishing the necessary timing and pulse generation means will be described below. It should be noted that other types of imaging devices in addition to those considered above are amenable to the present invention when the requisite means for compensating for the image shift is included.

Figure 6:
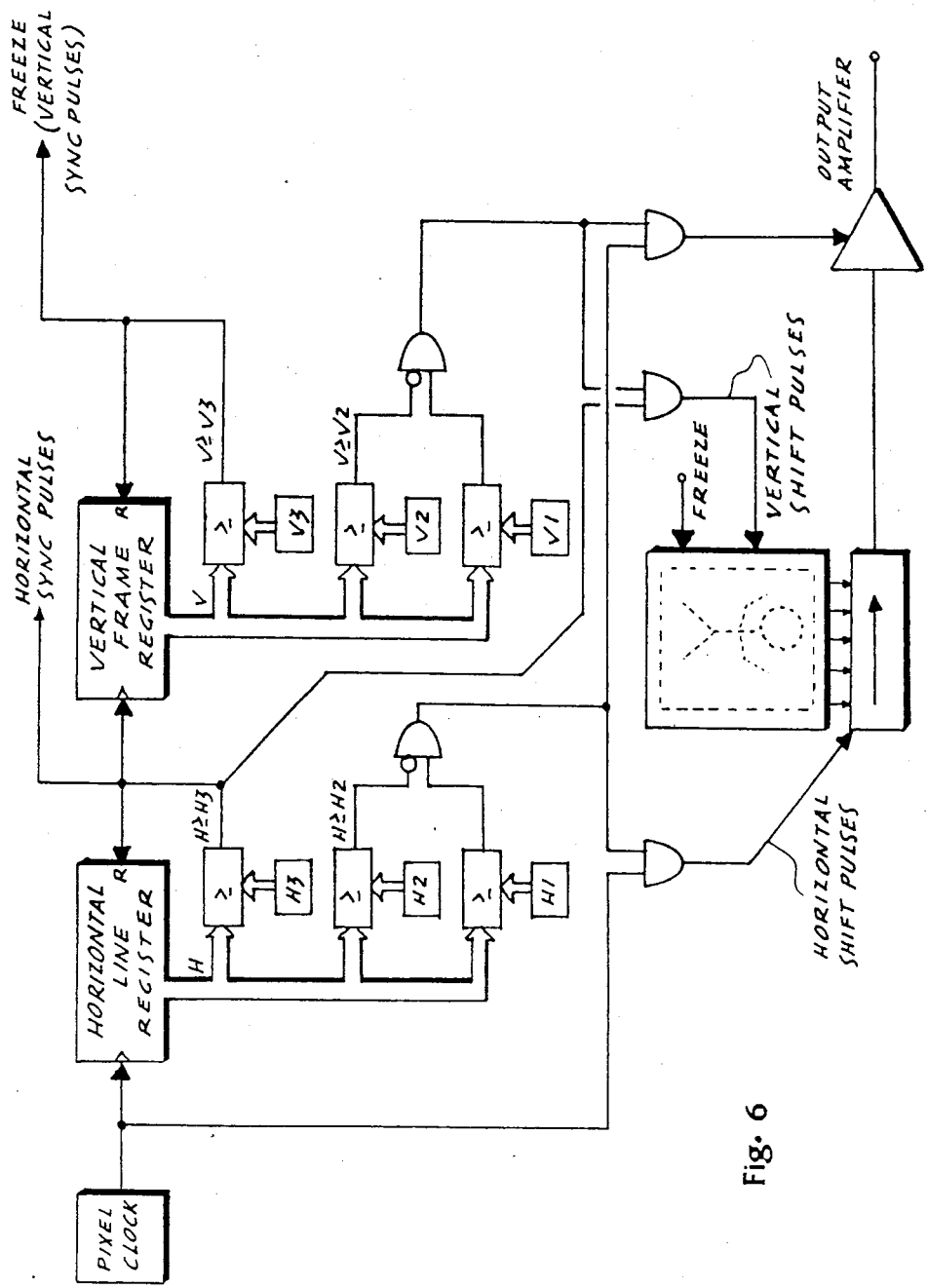

FIG. 6 shows a circuit involving standard logic elements for generating the timing and necessary pulses for a prior art freeze frame type CCD imaging device. A pixel clock generates pulses at a rate corresponding to the number of sensing elements in the horizontal direction divided by the standard line scanning time of the display means. These pulses are counted by a first counter, the horizontal line register, and the count is compared in a series of three digital comparators with three quantities represented by the digital values H1, H2, and H3. The quantity H3 represents the time to scan one horizontal line divided by the time per pixel; and the quantities H1 and H2 represent the amount of time following the horizontal sync pulse at which the output of the pixels begins and ends. When the counter registers the amount H3, a horizontal sync pulse is generated and the counter is reset to zero. Further pixel clock pulses cause the counter to count from zero, during which time pixels are prevented from being output (this corresponds to part of the horizontal blanking period). When the counter reaches H1, horizontal shift pulses are generated, causing the horizontal output buffer to begin shifting and sending pixels to the output amplifier. When the counter registers the count of H2, the horizontal shift pulses are no longer generated, and pixels are no longer sent to the output amplifier.

In a similar manner, the horizontal sync pulses increase the count in the vertical frame register until it registers a count of V3, at which point a vertical sync pulse is generated (otherwise known herein as the 'freeze' signal), and the register is reset to zero. As with the horizontal case, the shifting of the CCD device occurs only during the time that the frame register holds a count between V1 and V2. As shown also in FIG. 6, the output amplifier is gated by signals generated in the horizontal and vertical counting circuits so that a pixel output occurs only during the times the vertical frame register is between V1 and V2 and the horizontal line register is between H1 and H2.

Figure 7:
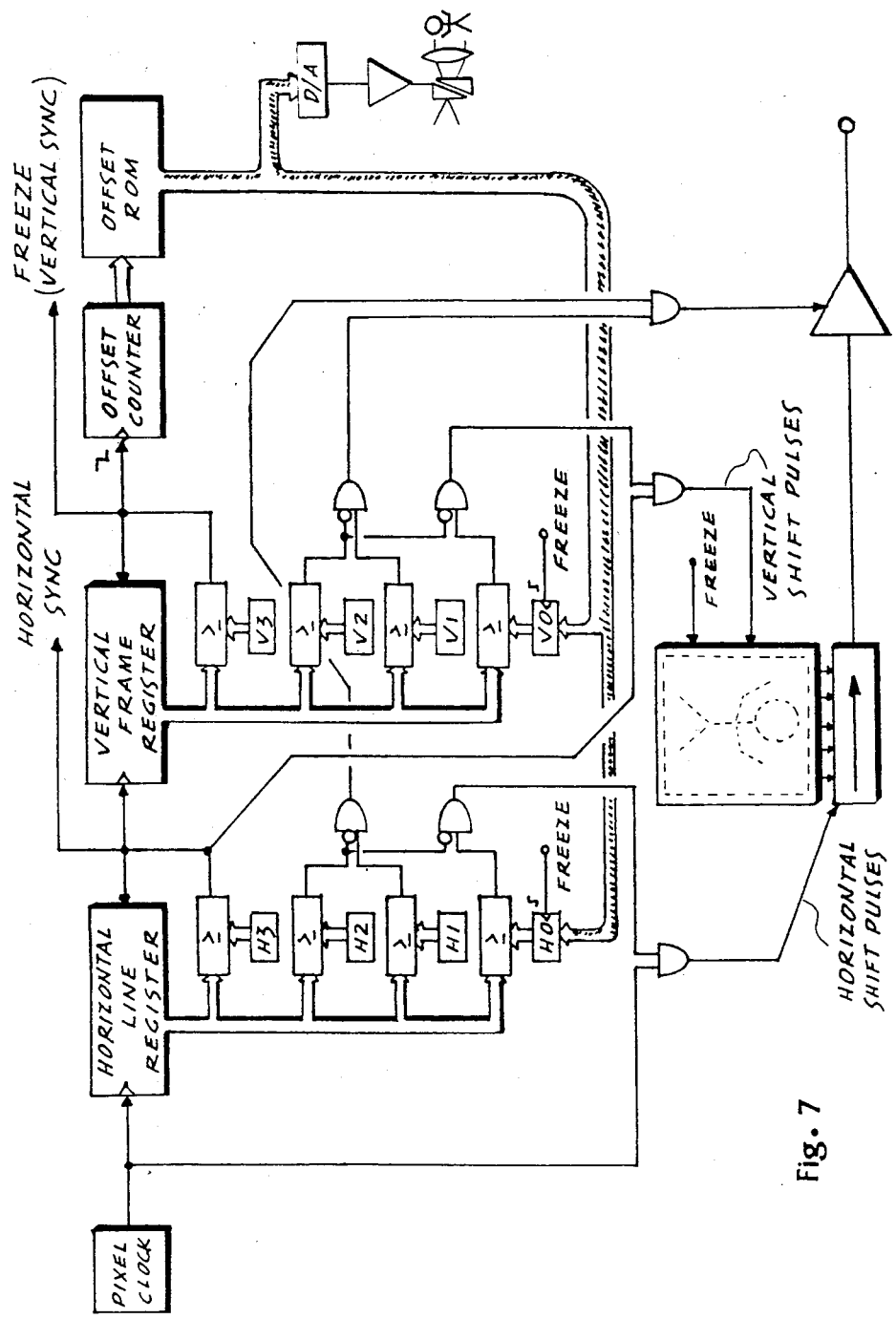
FIG. 7 shows a modification of the circuit of FIG. 6 which may be used to produce some of the timing patterns of FIG. 5a necessary for the present invention.

In order to modify this prior art circuit to be used with the present invention, it is necessary to provide circuitry so that the horizontal and vertical shift pulses can begin at other times as established by the amount of horizontal and vertical offset desired. A circuit to accomplish this is shown in FIG. 7, in which additional comparators have been added to both the horizontal and vertical counting circuits. These additional comparators are now responsible for controlling the horizontal and vertical shift pulses, in response to the values held in the latches H0 and V0. After the resetting of the horizontal line register, the register begins to count from zero until reaching the count H0, at which point horizontal shift pulses begin. The difference in the counts H0 and H1 represents the number of pixels of compensation to be provided in the horizontal direction. When the horizontal line register reaches a count of H1, the pixels may be gated through the output amplifier (depending upon the vertical count). When the line register reaches the count of H2, the horizontal shift pulses cease and the pixels are also restricted from further output. Then, upon reaching a count of H3 in the line register, the register is reset and a new horizontal cycle commences.

In a similar fashion, the vertical shift pulses occur after the vertical frame register reaches a count of V0 until it reaches V2, while the pixels are output between the counts of V1 and V2. The difference in the values V0 and V1 represents the amount of vertical offset. When the count of V3 is reached, the vertical frame register is reset and a vertical sync or 'freeze' signal is generated. As previously noted, this freeze signal causes the imaging data currently stored in the sensing elements to be frozen in the corresponding storage elements. In addition, on the leading edge of this signal, the digital numbers at the output of the Offset ROM are latched into the registers H0 and V0 so that the scanning mechanism responsible for scanning the frozen data will know how much offset will be necessary to compensate for the shifting of the relative location of the image and sensing elements. The freeze signal also causes the Offset Counter to be incremented, thereby causing the Offset ROM to output a new set of horizontal and vertical offsets to be presented via the D/A converters to the image shifting means. The Offset Counter is responsive to the trailing edge of the freeze signal.

Figure 8:
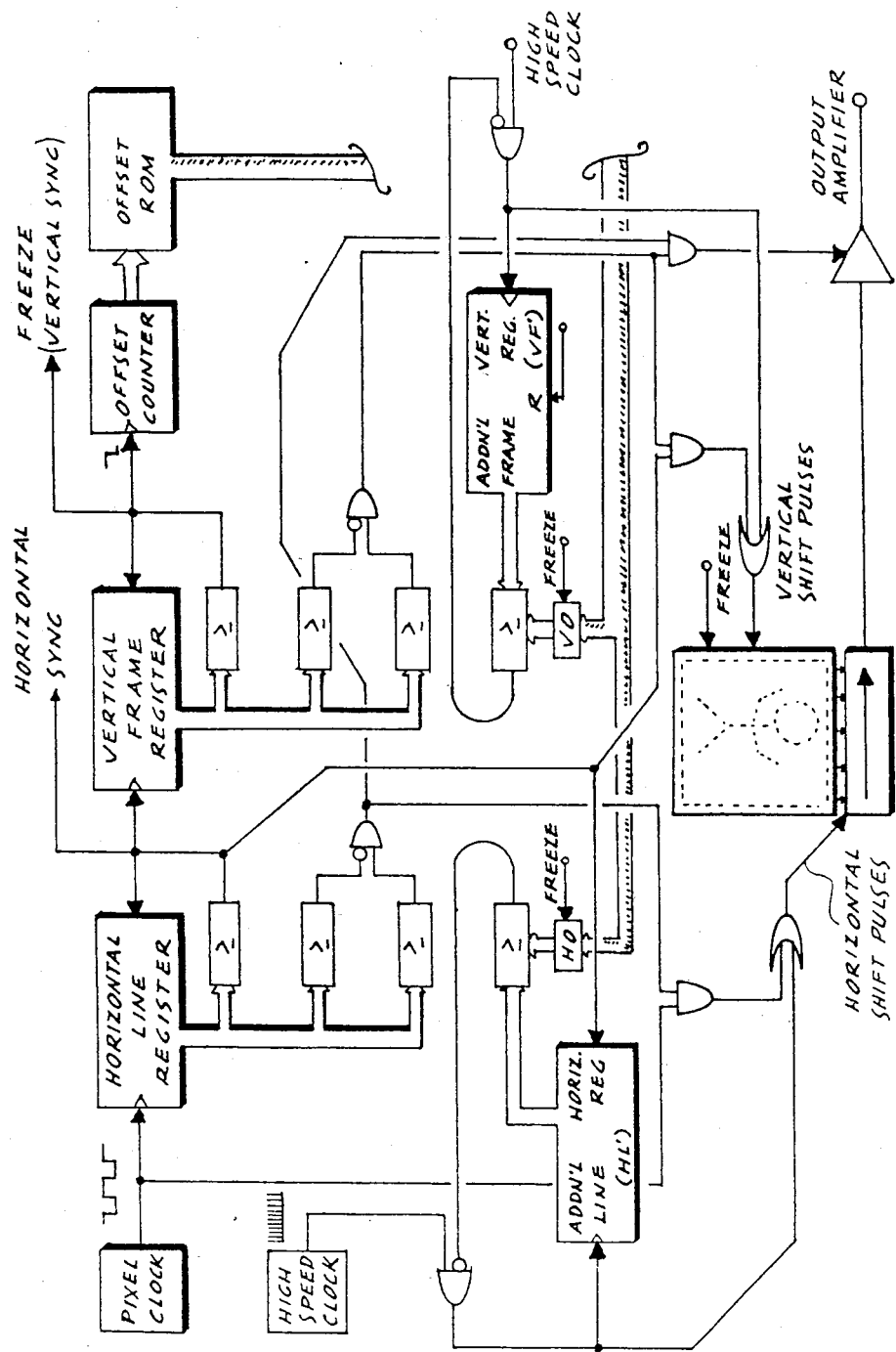
FIG. 8 shows another modification of the circuit of FIG. 6 which may be used to produce some of the timing patterns of FIG. 5a necessary for the present invention.

Another modification of the prior art circuit of FIG. 6 that may be used with the present invention is shown in FIG. 8. Unlike the circuit of FIG. 7, this circuit is capable of providing horizontal offset compensation of more than H1 pixels and vertical offset compensation of more than V1 lines. A high speed clock (having higher frequency than the pixel clock) provides additional horizontal pulses that are gated into the horizontal shift line at the beginning of the horizontal shift cycle. Each horizontal shift pulse causes the horizontal line buffer in the image scanning section to shift one position to the right. In addition, the pulses cause an additional horizontal line register (HL') to be incremented. The count stored in the register HL' is compared with the count stored in the latch H0. Upon reaching the count H0, further pulses are inhibited from the horizontal shift line, until the horizontal sync pulse resets the register to zero. The operation of the circuit between the time that the register HL' reaches the count H0 and the occurance of the horizontal sync pulse is the same as the prior art circuit of FIG. 6. In a similar manner, additional vertical shift pulses increment an additional vertical frame register (VF') and cause vertical shifts in the CCD device when the register is less than V0. These additional pulses may come from the high speed clock used for the extra horizontal pulses or from the pixel clock.

Figure 9:
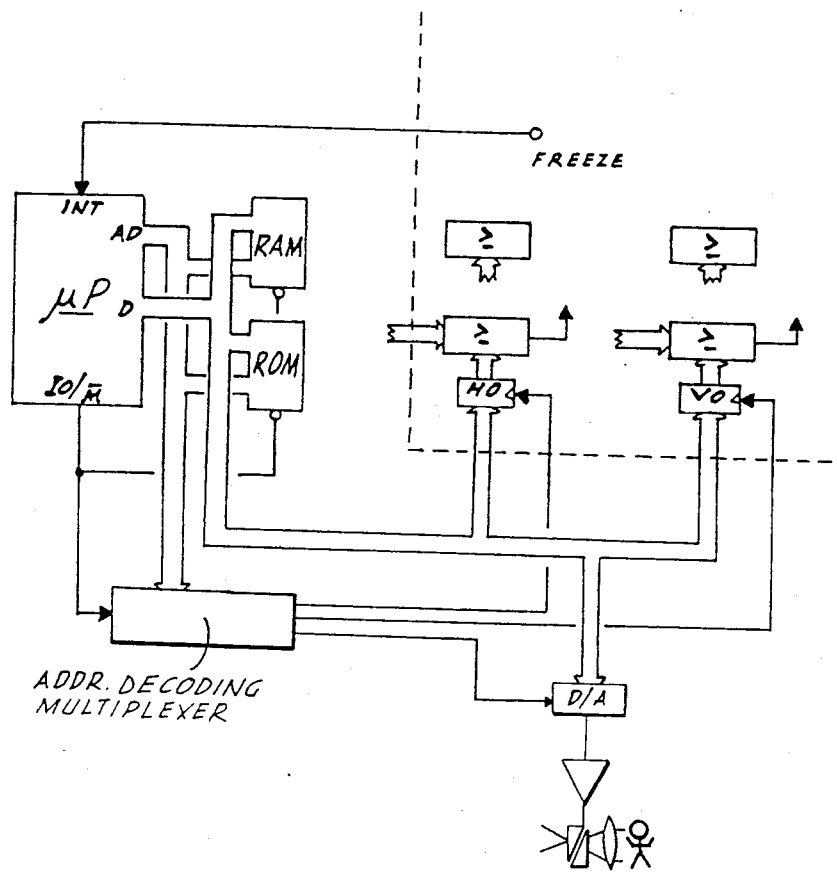
FIG. 9 shows a modification of the circuits of FIG. 7 or FIG. 8 which will allow a microprocessor to replace some of the logic elements in FIGS. 7 or 8.

In addition to utilizing standard logic elements to generate the timing signals, a microprocessor may also be employed in order to eliminate some of the logic elements. FIG. 9 shows a modification of the circuit of FIG. 7 in which the offset latches H0 and V0 are loaded by a microprocessor rather than directly from a ROM. When the microprocessor receives the freeze pulse, an interrupt causes the microprocessor to select the next values for the horizontal and vertical offsets and image shifting means, and to load these into the additional latches from the data bus. The use of a microprocessor allows increased flexibility in the selection of offset values. For example, a pseudo-random number generator may be employed. Also, the microprocessor may provide algorithms for computing the correct digital values to be output to the image shifting means in order to exactly match the horizontal and vertical offsets sent to the scanning circuitry.

The circuits described above for generating timing pulses in the invention were presented within the context of the freeze type CCD device. For the transfer and matrix plus memory types of CCD imaging devices also considered above, necessary modification of these circuits may be readily constructed by those skilled in the art.

This completes the detailed description of the operation of the basic embodiments of the proposed invention. The remainder of this specification will describe some of the preferred embodiments of the present invention that are also covered by the claims.

In the present invention, shifting occurs between the image and the image sensors from one scan to as least one other. Although the period of time during which the relative location is changing is small compared with the time during which the location is stationary, there may still be some smearing of the image during the movement, since the signal initiating the shift is given contemporaneously with the signal to begin the next exposure of the sensing elements. The smearing will be especially pronounced in those scenes where a bright object is located next to a dark object. Two methods are employed in the preferred embodiments of this invention in order to reduce such smearing effects: (a) removing the accumulated charges from the sensing elements after the period of relative motion, and (b) preventing the image from striking the image sensors during the period of relative motion.

Figure 10:
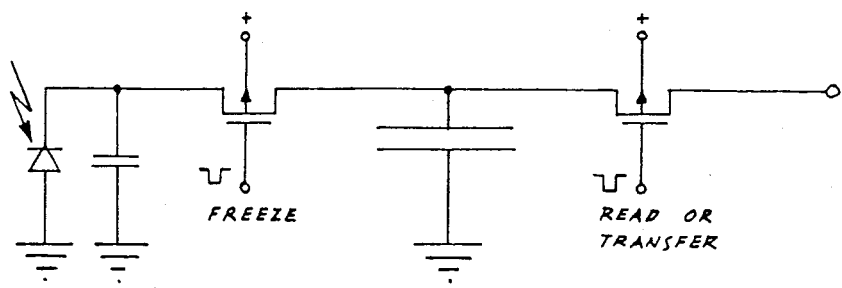
FIG. 10 depicts a cell in a matrix-type imaging device wherein the cell has an additional storage element and an additional gate for freezing the image data in the additional storage element.
Figure 11A:
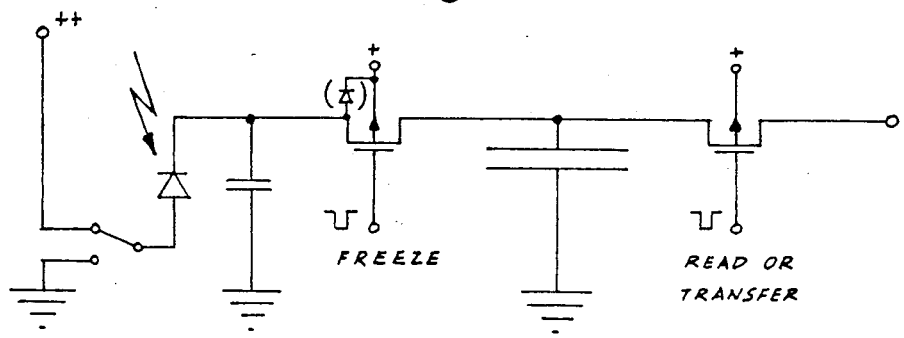
FIG. 11a shows a modification of the circuit depicted in FIG. 10 in order to provide a means for recharging the image sensing element.
Figure 11B:
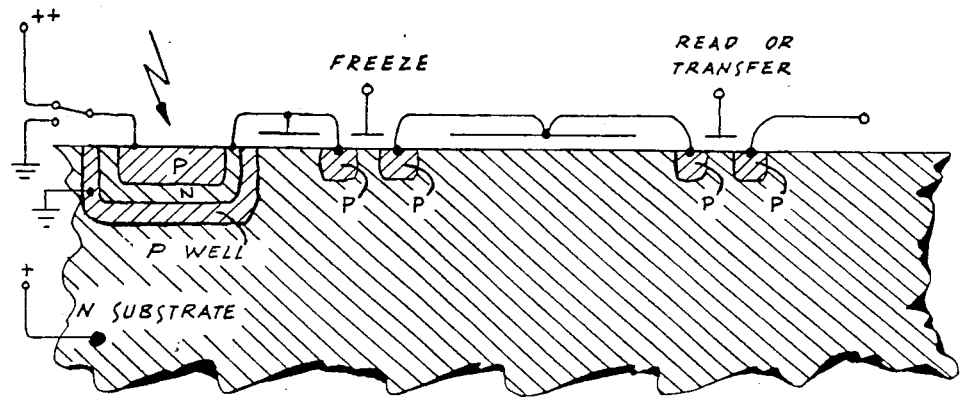

The method for removing the charges from the sensing elements depends upon the type of imaging elements in use. In the transfer type of CCD device, for example, the charges may be swept out of the sensing array by applying vertical shift pulses upward (i.e., away from the storage array) after the relative motion has ceased. For the freeze frame CCD devices and the matrix devices with additional storage elements, wherein the image sensor comprises a reverse-biased diode and the freeze signal controls the gate of a transistor such as an enhancement p-channel MOSFET as shown in the circuit of FIG. 10, the sensing diode may be recharged after the cessation of relative motion by providing a separate contact for the grounded terminal of the diode and raising the potential on that contact above the substrate potential for a short time as shown in FIG. 11a. By so doing, the sensing diode in series with the intrinsic p-n junction of the p-channel MOSFET gate of the 'freeze' signal will be forward biased, and any residual accumulated charges will be discharged through the substrate. An illustration of the physical layout for such a circuit is shown in FIG. 11b. Other circuits may also be devised for recharging the sensing elements, such as including an additional gating element in each cell to momentarily connect the sensing element to the power rails.

In addition to electronically removing the sensed charges after the relative motion of image and image sensors has ceased, the smearing effect of the relative motion may also be reduced by blocking the image from reaching the sensors during the time of motion. Such block may be accomplished by an electro-optic or an electromechanical shutter timed to open only while the relative location of the image and sensing elements is stationary.

In all of the embodiments of the invention described so far, the image data is passed directly to the output of the imaging system with no further processing other than to compensate for the shifting of the relative location of image and image sensors. Without further processing of the image data, the resultant signal will still appear to have improved clarity, inasmuch as any imaging errors or variations in sensitivity of the sensing elements will be shifted to a plurality of locations during successive scans, and therefore will tend to be averaged out due to the integrating effect of the human eye. It is possible to further improve the image, however, within the imaging system.

One preferred method for further processing the image data within the imaging system is to provide a small memory for storing pixels during one scan to replace defective pixels during at least a second scan. In this embodiment of the invention, the small memory is similar to the small memories conventionally included in large semiconductor memory arrays to replace a few defective memory cells within the large arrays. The small additional memory may be only a tiny fraction of the size of the array. For example, an imaging system containing an array of $1024 \times 512$ imaging elements will contain 512K total imaging elements. If 100 of these elements are defective, the memory need contain fewer than 0.1% of the number of cells in the original array.

In order to understand the operation of the preferred embodiments having a small error memory, reference is made first to FIG. 2 of this specification in which the image data without further processing are sent to the display device. During a first scan, the defective pixels will appear at the two top positions on the display device. During a second scan, the defective pixels will appear at the middle position on the display device. During a third scan, the defective pixels will appear at the bottom position on the display device. Notice that during the second scan, the defective pixels are at locations on the display that were free from defects during the first scan. Similarly, during the third scan, the defective pixels are at locations that were free from defects during the second (and first) scans. If pixels are stored in a small memory during the first scan at the locations that will soon hold the defective pixels during the second scan, then during the second scan these stored pixels may be used in place of the defective pixels to obtain an improved image signal. Also during the second scan, a new set of good pixels must be stored to replace the defective pixels during the third scan. Thus a memory having two storage locations for every defective pixel in the array may be used in the present embodiment. During any one scan, the first set of storage locations will hold the pixel data stored during a previous scan to replace defective pixels during this scan, while the second set of locations will be used to store the pixel data during this scan to be used during a future scan.

Figure 12:
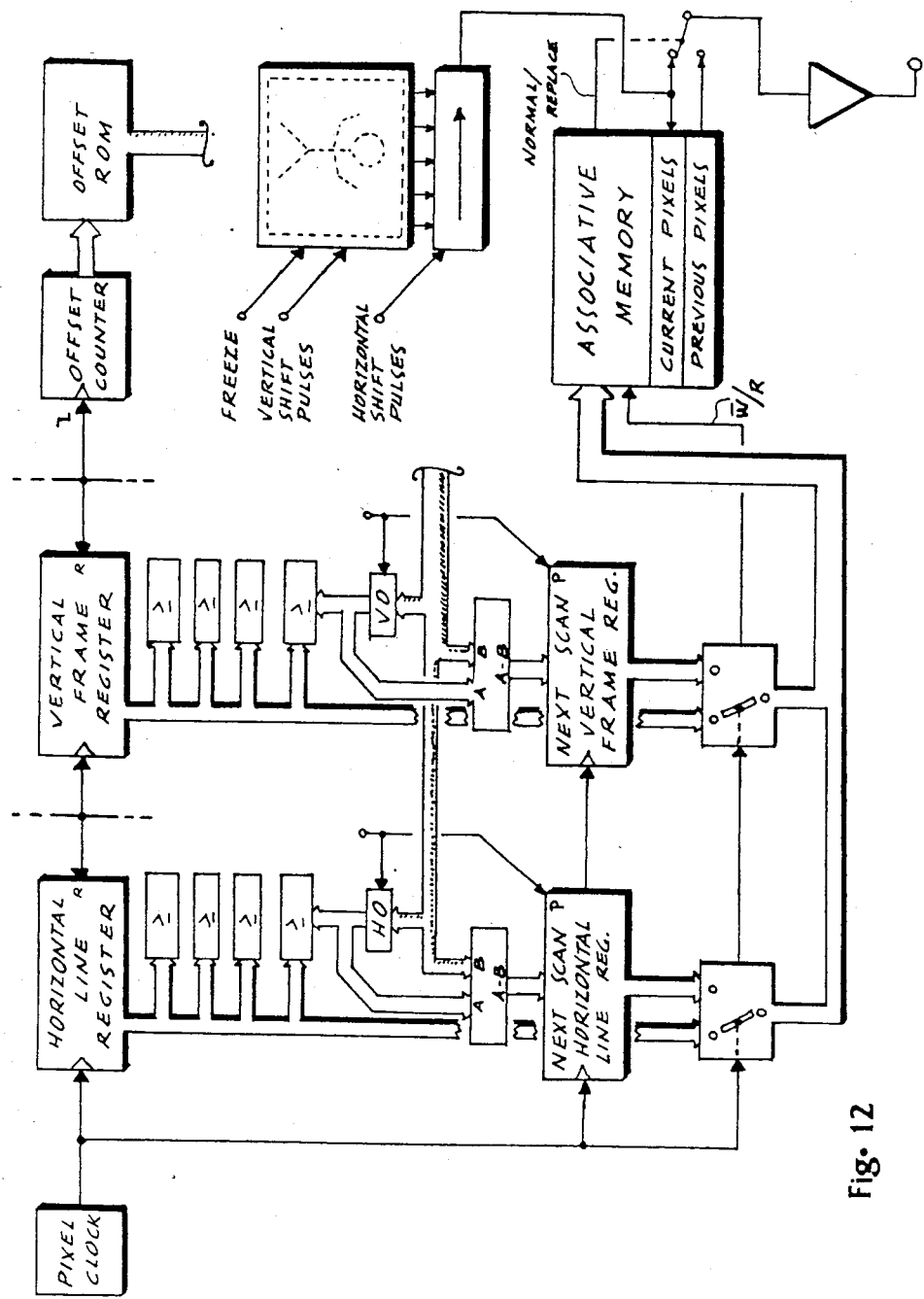
FIG. 12 shows a modification of the circuit of FIG. 7 for a preferred embodiment of the invention in which a small associative memory retains image data from one scan to replace defective data during another scan.

A circuit to accomplish this storage and recall of pixels is shown in FIG. 12. The additional memory is an associative memory having a series of locations, each having three parts: a content-addressable location for storing the absolute address of the defective pixel in the imaging array (e.g., horizontal and vertical addresses in the case of a two-dimensional array); a second part for storing one replacement pixel: and a third part for storing a second replacement pixel. The memory is big enough to have each of these three parts for every defective pixel in the array. In the circuit of FIG. 12 there are two sets of line and frame registers, a first set for holding counts representing the current scanning location; a second set for holding counts representing the counts that will appear in the first set of registers during the next scan. During each pixel cycle, the associative memory is checked twice, once for the first set of line-frame registers and once for the second set of registers, to see if any addresses match. If so, the pixel data is gated into or out of the memory corresponding to whether or not the first set or second set of registers match the address. In the circuit of FIG. 12, the upper data part always holds the data from the current scan, and the lower part always holds the data from a previous scan. At the end of the scan cycle (upon receiving the freeze signal), the data in the upper part is shifted into the lower part to serve as the past data during the next scan. Although the circuit of FIG. 12 represents an improvement over the circuit of FIG. 7 in order to accomodate the additional memory, a similar circuit may easily be constructed as an improvement over any timing circuit by those skilled in the art.

A further embodiment of this invention concerns the case where the raster is interlaced. In such case, the frame is scanned at every other line during a first scan (or 'field'), and the remaining lines during a second field (there may also be n-fold interlace, in which case every nth line is scanned during n fields, instead of just the case where n=2). Although the present invention may be used directly with an interlace system without further modifications than those described in the above embodiments, the structure of the invention allows a simpler method for performing the interlaced scan that is useful to exploit. The improved method consists in making the shift of relative location of image and image sensors during the second field of the interlace scan to have an additional fractional number of lines on top of the amount specified by this invention, and compensating for only the amount specified by this invention. For example, if the specified vertical offset for a given frame is 23 lines, then during the first field of that frame the shift and the compensation will be set at 23 lines, whereas during the second field the compensation will still be 23 lines but the shift will be 23.5 lines. Circuitry for accomplishing this interlace scanning as an improvement over the circuits already presented may easily be designed by those skilled in the art.

The final embodiment of the invention to be described in this specification concerns a slight modification of the embodiments already presented if the shift of the relative location of the image and image sensors also introduces a distortion of the image. It may happen that the particular means used to accomplish the shift also causes a lengthening or shortening of the image in one or more directions. The amount of distortion will be a known function of the horizontal and vertical offsets. To partially compensate for such distortions, pixels or complete lines of pixels may be routinely skipped or repeated during appropriate points in the scan. The points in the scan during which corrections are to be made may be stored in the Offset ROM and recalled in addition to the offset data.

What I claim as new and desire to secure by Letters Patent of the United States is:

1. In a method for deriving image signals from an imaging means having a plurality of image sensing elements and a plurality of image data storage locations, including at least a first cycle and a second cycle of the steps of:
   (a) exposing the sensing elements to an image to develop image data,
   (b) storing the image data in the plurality of storage locations, and
   (c) scanning the plurality of storage locations to develop the image signal;

and for which there may be defined three finite periods of time, T1, T2, T3; whereby
   T1 corresponds to a finite portion of step (a) of said first cycle,
   T3 corresponds to a finite portion of step (a) of said second cycle, and
   T2 lies between T1 and T3;

and wherein there is a tendency for the imaging means to produce less than a complete array of image pixels for each image signal; the improvement including
   changing the location of the image relative to the image sensing elements during said finite period of time T2, such that substantially no image-degrading change in the location of the image relative to the image sensing elements occurs during said finite periods of time T1 and T3; and
   compensating the derived image signal for said change in location of the image;
whereby missing portions of said complete array of image pixels are associated with different portions of the image during said at least two cycles.

2. The method of claim 1 wherein the length in time of at least one of step (a) of said first cycle and step (a) of said second cycle is limited in order to avoid overlap in time with said finite period of time T2.

3. The method of claim 1 wherein the improvement includes the additional step of clearing the image data from the image sensing elements during the step (a) of said second cycle.

4. The method of claim 1 wherein the improvement includes the step of storing portions of the image signals to be used in substitution for missing portions of the complete array of image pixels.

5. The method of claim 1 wherein the compensation for the change in location of the image relative to the image sensing elements is in accordance with an offset for the desired interlace between scans.

6. The method of claim 1 wherein the improvement includes the step of further compensating the image signal in order to remove geometrical distortion caused by the change in location of the image relative to the image sensing elements.

7. The method of claim 2 wherein said length in time of at least one of step (a) of said first cycle and step (a) of said second cycle is limited by controlling the rays of radiation corresponding to said image by at least one of the steps of:
  (a) effecting a radiation barrier between said rays of radiation and said image sensing elements; and
  (b) extinguishing the sources of radiation from whence said rays of radiation are derived.

8. In an imaging system having a plurality of image sensing elements, a plurality of storage locations, and means for deriving at least two image signals from the sensing elements by carrying out at least a first cycle and a second cycle of:
  (a) exposing the image sensing elements to an image to develop image data,
  (b) storing the image data in the plurality of storage locations, and
  (c) scanning the plurality of storage locations to develop the image signal;
and wherein there is a tendency for the imaging system to produce less than a complete array of image pixels for each image signal; the improvement including
  means for changing the location of the image relative to the image sensing elements subsequent to a finite period of time T1 corresponding to a finite portion of said first cycle of exposing and prior to a finite period of time T3 corresponding to a finite portion of said second cycle of exposing, such that said means for changing the location of the image relative to the image sensing elements produces substantially no image-degrading change during said finite periods of time T1 and T3; and
  means for compensating the image signal for said change in location of the image;
whereby missing portions of said complete array of image pixels are thereby associated with different portions of the image for the derivation of each of the at least two image signals.

9. The system of claim 8 wherein the improvement includes means for limiting at least one of said first cycle of exposing and said second cycle of exposing in order to avoid overlap in time with a period of time T2 lying between said finite periods of time T1 and T3.

10. The system of claim 8 wherein the improvement includes means for clearing the image data from the image sensing elements during said second cycle of exposing.

11. The system of claim 8 wherein said location changing means includes means responsive to an electric signal for changing the location of the image relative to the image sensing elements.

12. The system of claim 11 wherein said electric signal responsive means comprises an assembly having at least one region containing a medium whose index of refraction varies with an applied voltage.

13. The system of claim 12 wherein said at least one voltage sensitive region has a lower index of refraction than at least one other region of the assembly in order to compensate for distortions introduced by electrically changing the index of refraction.

14. The system of claim 11 wherein said electric signal responsive means comprises an assembly having at least one region containing a liquid crystal medium.

15. The system of claim 8 wherein the improvement includes means for storing portions of the image signals to be used in substitution for missing portions of said complete array of image pixels.

16. The system of claim 8 wherein the improvement includes means for removing geometrical distortion caused by the change in location of the image relative to the image sensing elements.

17. The system of claim 12 wherein said assembly is fixedly attached to said image sensing elements.

18. The system of claim 12 wherein said assembly includes a reflective surface in order to cause the rays of radiation corresponding to said image to pass a second time through said medium whose index of refraction varies with an applied voltage.

19. The system of claim 8 wherein each of said image sensing elements lies substantially along a two-dimensional surface.

20. The system of claim 19 wherein the locations of said image sensing elements are defined substantially by a subset of a two-dimensional lattice.

21. The system of claim 14 wherein said assembly includes a polarizing filter.

22. In an imaging system having a plurality of image sensing elements, a plurality of storage locations, and means for deriving at least two image signals from the sensing elements by carrying out at least a first cycle and a second cycle of:
  (a) exposing the image sensing elements to an image to develop image data,
  (b) storing the image data in the plurality of storage locations, and
  (c) scanning the plurality of storage locations to develop the image signal;
and wherein there is a tendency for the imaging means to produce less than a complete array of image pixels for each image signal; the improvement including
  means for changing the location of the image relative to the image sensing elements subsequent to a finite period of time T1 corresponding to a finite portion of said first cycle of exposing and prior to a finite period of time T3 corresponding to a finite portion of said second cycle of exposing, such that said means for changing the location of the image relative to the image sensing elements produces substantially no image-degrading change during said finite periods of time T1 and T3;
  means to compensate the image signal for said change in location of the image; and
  microprocessor means programmed to (1) control said relative location changing means and (2) control said compensation means;
whereby missing portions of said complete array of image pixels are thereby associated with different portions of the image for the derivation of each of the at least two image signals.

23. The system of claim 22 wherein the improvement includes means for storing portions of the image signals and means for recalling said stored portions of image signals to be used in substitution for missing portions of said complete array of image pixels.

24. The system of claim 23 wherein said storing means and said recalling means are responsive to signals from said microprocessor means.

* * * * *